United States Patent [19]

Thompson

[11] Patent Number: 4,628,197

[45] Date of Patent: Dec. 9, 1986

[54] ELECTRONICS FOR FIBER OPTIC VORTEX SHEDDING FLOW METER

[75] Inventor: William L. Thompson, Montville, Ohio

[73] Assignee: The Babcock & Wilcox Company, New Orleans, La.

[21] Appl. No.: 612,284

[22] Filed: May 21, 1984

[51] Int. Cl.[4] .......................... H01J 5/16; H01J 40/14
[52] U.S. Cl. .................................. 250/227; 250/214 R
[58] Field of Search .............. 250/227, 231 P, 231 R, 250/206, 214 R; 307/308, 353, 311

[56] References Cited

U.S. PATENT DOCUMENTS 4,011,754 3/1977 Pitt ........................................ 250/227
4,552,026 11/1985 Knudsen et al. ..................... 250/227

Primary Examiner—Edward P. Westin
Assistant Examiner—S. Allen
Attorney, Agent, or Firm—Vytas R. Matas; Robert J. Edwards

[57] ABSTRACT

An optical sensor arrangement comprises a light-emitting diode which is connected to a light detector over a light connection such as a fiber optics fiber. The fiber may be provided in the vicinity of a vortex shedding flow meter and is bent by the passage of vortices past the fiber. Bending the fiber causes attenuation of the light signal from the light-emitting diode to the light detector. The light-emitting diode is powered by a pulse generator which supplies the diode with low duty cycle high-current pulses. The resulting detected pulses are amplified, sampled and held to obtain peak values for each pulse. The detected pulse is suppressed by a feedback circuit portion which is activated only after each low duty cycle high current pulse. The detected peaks are utilized to generate a square wave which is used as a measurement of the variable, in particular the passage of vortices in a vortex shedding flow meter.

8 Claims, 6 Drawing Figures

FIG. 1A

ELECTRONICS FOR FIBER OPTIC VORTEX SHEDDING FLOW METER

FIELD AND BACKGROUND OF THE INVENTION

The present invention relates, in general, to electronic sensor circuits and, in particular, to a new and useful circuit for use in a fiber optic vortex shedding flow meter which utilizes the bending of a fiber optics fiber for determining the flow of a fluid.

Fiber optic vortex shedding flow meters are known which utilize a fiber that can transmit light which is connected between a light emitting device and a light detecting device. Bending in the fiber due to the passage of shedded vortices from an obstruction in a flow passage give a measurement of the flow rate.

Two-wire, 4 to 20 ma (milliamps) control transmitters are known and utilized as a standard mechanism for transmitting signals.

The electronics for a two-wire, 4–20 ma industrial control transmitter has only about 3.5 ma and 10 volts with which to operate. Fiber optic systems presently require several ma for the light emitter, often 200 ma or greater and as such are not compatible with two-wire, 4–20 ma transmitters.

SUMMARY OF THE INVENTION

An object of the present invention is to utilize a two-wire, 4–20 ma industrial control transmitter with a fiber optic vortex shedding flow meter circuit which would normally not be compatible for such a control transmitter.

Pulse mode or low-duty-cycle operation is necessary to utilize a fiber optic sensor in a 4–20 ma transmitter. This invention gives a method and circuit to achieve such low-duty-cycle operation and the associated techniques to make it suitable for use in a two-wire, 4–20 ma vortex shedding flow meter transmitter.

A microbend sensor or other sensor with variable light attenuation controlled by a process variable being measured, may be used. The microbend sensor modulates the received light by only a small amount which is on the order of 2 percent maximum. The electronics must make this small change into a full-scale output. This is accomplished by bucking the signal from the light detector and amplifying it. The bucking is controlled by a feedback circuit so that the average height of the peaks of the pulsed light signal are controlled to a fixed level. This control has a long time-constant so that rapid changes in the signal, the vortex shedding frequencies, are passed. These frequencies are demodulated from the pulse signals by sample and hold circuits and used to control the 4–20 ma output.

Power is gated to a preamp circuit to save power. The preamp uses a programmable current opamp. High current operation is necessary to amplify the fast pulses from the fiber optics. However, the low current mode is adequate during the off period of the sampling. Gating the current to the preamp in conjunction with the optic system pulse results in a significant power savings.

Accordingly, an object of the present invention is to provide an optical sensor arrangement which includes light-emitting means, light-detecting means and light-connection means connected between the light-emitting means and the light-detecting means for attenuating light from the light-emitting means to the light-detecting means according to a variable to be measured. A pulse generator with appropriate isolation elements is connected to the light-emitting means for applying low duty cycle high-current pulses to the light-emitting means for generating a low duty cycle light pulse which is transmitted to the light detector which, in turn, forms detected pulses. Sample and hold means have an input connected to the light detecting means for sampling the detected pulses and for holding a peak value for each pulse at an output of the sample and hold means. Feedback means are connected between the output and input of the sample and hold means for returning a signal from the output to the input only immediately after a pulse from the pulse generator to suppress the detected pulse after each light pulse. Square wave means are connected to the sample and hold means to provide a square wave corresponding to the variable to be measured.

A further object of the invention is to provide a square wave corresponding to the variable to be measured.

A further object of the invention is to provide a method of operating an optical sensor comprising providing low duty cycle high current pulses to a light-emitting device which is connected to a light-detecting device over a light-connection which transmits light with varying attenuation according to a variable to be measured. Detected pulses in the light detector are sampled and held to obtain peak values for each pulse which can be utilized to generate square waves corresponding to the variable to be measured. Immediately after the end of each low-duty cycle high-current pulse, a signal is fed back from the output of the sample and hold mechanism to the input thereof for suppressing the detected pulse from the detector.

A still further object of the invention is to provide an electronic circuit for an optical sensor which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the Drawings:

FIG. 1A is a schematic diagram showing part of a circuit in accordance with the invention;

DESCRIPTION OF THE PREFERRED EMBODIMENT

Figure 1A:
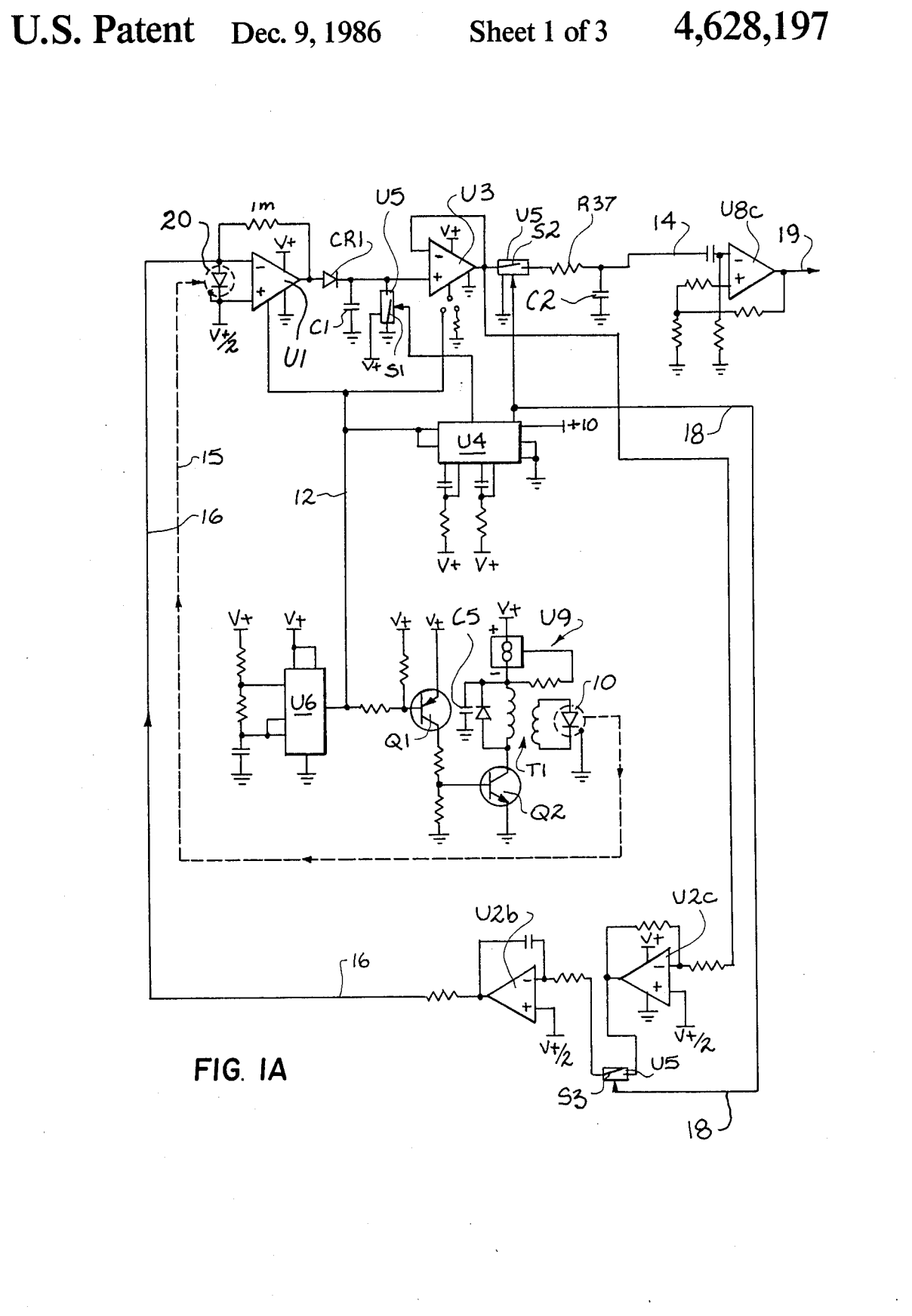
Figure 1B:
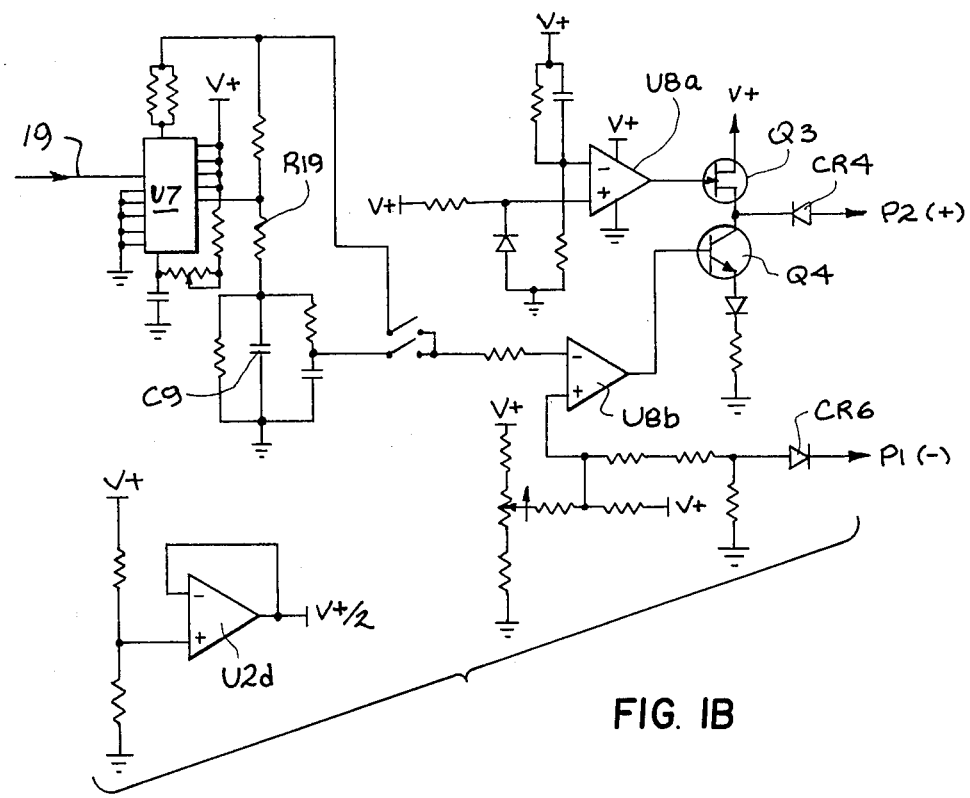
FIG. 1B is the remainder of the circuit shown in FIG. 1A.

FIGS. 1A and 1B are schematic diagrams of the electronics which are suitable for a readout of a fiber optic microbend sensor as used in a vortex shedding flowmeter, according to the invention.

Figure 2:
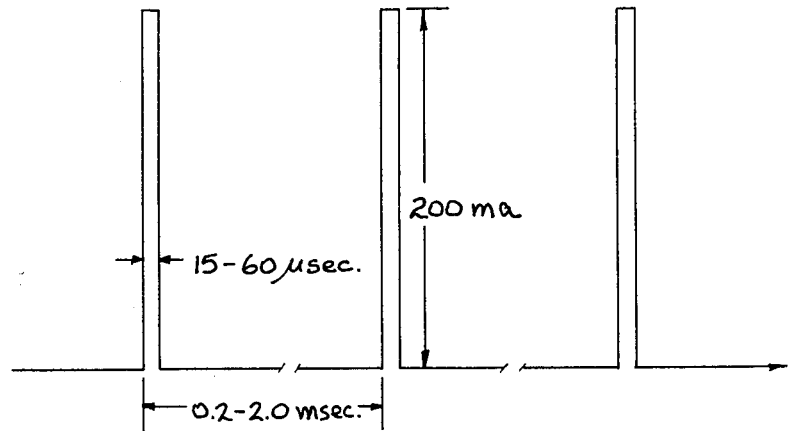
FIG. 2 is a graph showing the low duty cycle high current pulses to be applied to a light-emitting diode (LED) in the optical sensor arrangement of the invention.

Current to an LED 10 (Light-Emitting-Diode) is supplied as a series of pulses, typically having a duty cycle of 1 to 2 percent, an amplitude of 200 ma and a repetition rate or frequency of 500 to 500 Hz. Oscillator, U6, typically a low-power CMOS version of a 555 timer such as 7555, is used to generate the control signal for the LED current. Transistor Q1 and Q2 amplify the 7555's output. Transformer T1 serves to match the drive requirements of 1.5 volts for the LED to the circuit's higher drive voltage of typically 6 to 10 volts. This transformer is typically a pulse transformer with a 4:1 turns ratio. Current regulator U9 and capacitor C5 serve to isolate the high pulses of current from creating voltage pulses on the power supply for the rest of the transmitter circuit by limiting the peak current to around 1 ma and storing charge in the capacitor between the LED pulses. Then the LED current primarily comes from the charge stored in capacitor C5. FIG. 2 shows the current waveform to LED 10.

The light pulses are transmitted to a light detector 20 by a fiber optic cable shown schematically at 15. Varying attenuation is effected typically by application of bending to the fiber 15 or the changing of coupling at a discontinuity in the fiber. The light detector 20 converts the received light into an electrical signal, typically a current. In the implementation in FIG. 1A, the detector supplies a current to the following circuit.

A preamp U1 converts the detector current pulses into voltage pulses. The integrated circuit used must be capable of low power operation and have sufficient bandwidth to faithfully amplify the pulses. Type T1C251 from Texas Instruments is a programmable CMOS opamp which meets these requirements. In the low-current mode it meets the power requirements. The high-current mode has the bandwidth necessary for amplifying the pulses. The amplifier is switched into the high power and high bandwidth mode only when the pulse is present (controlled by the drive signal to the LED from line 12). Thus, it is not drawing the high power during periods when such is not necessary to the circuit's operation.

Figure 3:
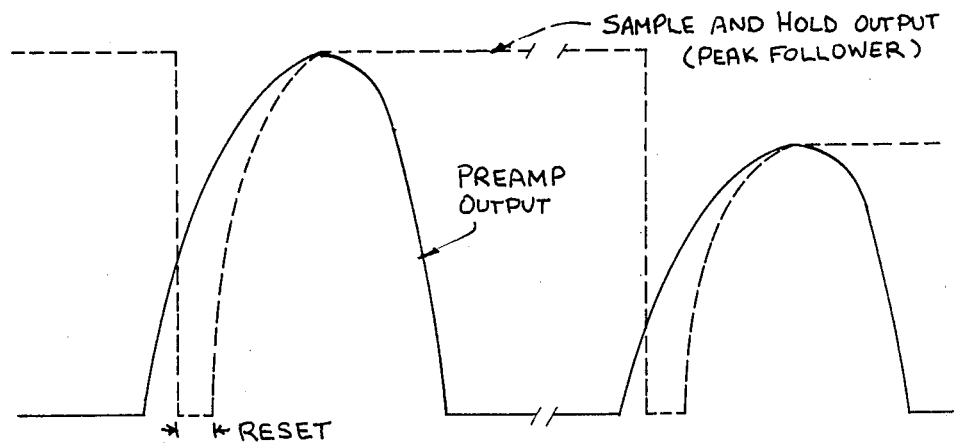
FIG. 3 is a graph showing the output of a preamp connected to a light detector associated with the light-emitting diode.

A peak-following sample and hold function is performed by the combination of capacitor C1, diode CR1 and switch S1 (which is part of switch circuits U5). S1 discharges the voltage of C1 at the beginning of the light pulse. S1 is controlled by a one-shot multivibrator circuit in U4 (MC14538 or MC14528) which is triggered by the beginning of the pulse to the LED10 over line 12. Then C1 charges through diode CR1 from the output of the preamp U1. C1 stops charging at the peak of the preamp output and the diode prevents the immediate discharge necessary to follow the downside of the pulse. FIG. 3 shows this operation. Opamp U3 buffers the voltage on C1, allowing the following circuitry to operate without affecting the signal on C1.

Figure 4:
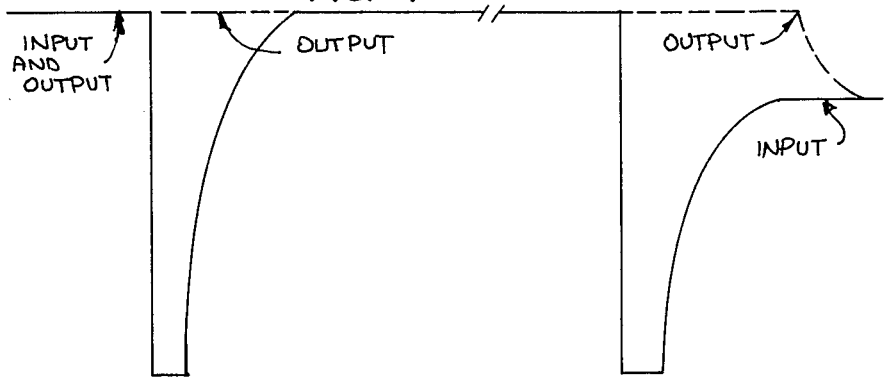
FIG. 4 is a graph showing the output of a sample and hold circuit portion connected to the preamp.

A second sample and hold is performed by switch S2 (also part of U5), resistor R37, and capacitor C2. Switch S2 is closed after the LED Pulse has finished. The peak of the pulse as stored on capacitor C1 is sampled and stored on C2. The resistor R37 and capacitor C2 perform to low-pass filtering action to reduce the sampling frequency (LED pulse frequency) component from the signal received from the optical system. FIG. 4 shows the output of this circuit which is on line 14. Circuit U5 may be a 4066 circuit.

Opamps U2b and U2c form a feedback control loop. The loop compares the peaks of the pulses with signal ground and returns a current to the preamp input over line 16 to drive the peaks back to ground. This is necessary since the pulses are quite large, sufficient to drive the preamp U1 into saturation.

Figure 5:
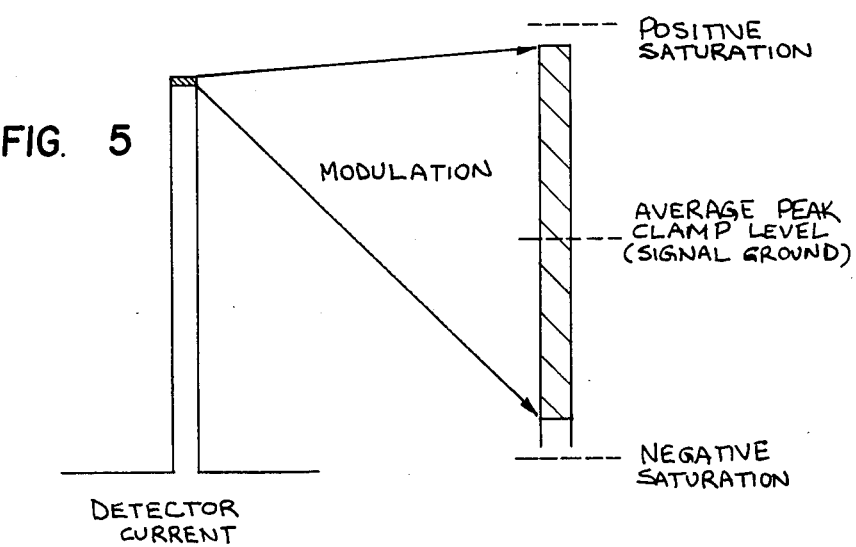
FIG. 5 is a graph with a portion shown in an enlarged scale illustrating the detected current.

FIG. 5 shows the signal and the typically 2 percent maximum modulation. The effect of this circuit on the signal is shown also. U2B is an integrator (or low pass filter) so that the adjustment effect is slow-acting. Thus long term variations are removed and signal components are not affected. Switch S3 controls the operation of this loop so that it only operates immediately following the end of the pulse to the LED by line 18. This removes any influences from decay on capacitor C1's voltage between signal pulses.

Internal power supply is regulated by U8a and its associated components, including Q3, a series pass field effect transistor (FET). Opamp U2d divides the internal power supply, typically 10 volts, into two 5-volt supplies with signal ground in the middle. This allows for operation of amplifiers that have voltage swing and below signal ground.

The typically low level sine wave signal on line 14 from the second sample and hold is operated on by hysteresis comparator U8c, and converts it to a rectangular or square wave. This rectangular or square wave is used to trigger a one-shot multivibrator U7 (FIG. 1B) to give a fixed length, fixed amplitude pulse for each cycle of the sine wave signal from the optical system. This is then averaged by R19 and C9 and used to control the 4-40 ma output signal by the circuit of opamp U8b, Q4 and their associated resistors. U7 may be an MC14538, and is connected to hysteresis comparator by line 19.

Two-wire 4–20 ma output is thus obtained at P2 and P1 from diodes CR4 and CR6 respectively.

While a specific embodiment of the invention has been shown and described in detail to illustrate the application of the principles of the invention, it will be understood that the invention may be embodied otherwise without departing from such principles.

What is claimed is:

1. An optical sensor arrangement comprising:
   light-emitting means;
   light-detecting means;
   light-connection means connected between said light-emitting means and said light-detecting means for varying an attenuation of light from said light-emitting means to said light-detecting means according to a variable to be measured;
   pulse generator means connected to said lightemitting means for applying low-duty cycle, high-current pulses to said light-emitting means for generating lowduty cycle light pulses which are transmitted to said light-detecting means for generating detected pulses;
   sample and hold means having an input connected to said light-detecting means for sampling said detected pulses and for holding a peak value for each pulse at an output of said sample and hold means;
   feedback means connected between said input and said output of said sample and hold means for returning a signal to said input immediately after each low duty cycle high current pulse of said pulse generator means to suppress said detected pulses after each low-duty cycle, high-current pulse; and
   square wave generator means connected to said sample and hold means for forming a square wave signal corresponding to the variable to be measured.

2. An arrangement according to claim 1, wherein said sample and hold means includes a first amplifier connected to said light detecting means, said first amplifier having a first high-power, high bandwidth position and a second low-power low bandwidth position, said first amplifier having a first position only when one of said low-duty high-current pulses is present and said first amplifier having second position at all other times.

3. An arrangement according to claim 2, including switching means having an input connected to said pulse generator means and an output connected to said sample and hold means for controlling said sample and hold means to obtain a peak value for each detected pulse during each low-duty cycle high-current pulse and for applying a signal to said square wave generator means immediately after each low-duty cycle high current pulse.

4. An arrangement according to claim 3, including connecting means for connecting, said switching means to said feedback means for returning the signal immediately after each low-duty cycle high current pulse.

5. An arrangement according to claim 4, wherein said sample and hold means includes a first sample and hold circuit including a capacitor for being charged by an output of said first amplifier, said switching means including a first switch connected to said capacitor for grounding said capacitor to remove its charge immediately before each low-duty cycle high current pulse of said pulse generator means, and a second sample and hold circuit including a second amplifier having an input connected to said first capacitor and an output connected to a second switch, a second capacitor connected to said second switch, said second switch being closed after each low-duty cycle high-current pulse for charging said second capacitor.

6. An arrangement according to claim 5, wherein said feedback means comprises a third amplifier connected to said output of said second amplifier, a third switch connected to an output of said third amplifier, an integrating amplifier having an input connected to said third switch and an output connected to said input of said first amplifier, said third switch being closed immediately after each low-duty cycle high-current pulse of said pulse generator means.

7. A method of operating an optical sensor arrangement having a light-emitter, a light-connection which attenuates light by a variable amount in accordance with a variable to be measured, and a light-detector connected to the light connection, comprising:
applying low-duty cycle high-current pulses to the light emitter to generate light pulses;
detecting the light pulses with the light detector to generate detected pulses;
sampling and holding peak values for the detected pulses during each low-duty cycle high-current pulse;
returning a suppressing signal to the light detector immediately after the termination of each low-duty cycle high-current pulse; and
generating a square wave using the peak values for the detected pulses which corresponds to the variable to be measured.

8. A method according to claim 7, including amplifying the detected pulses during each low-duty cycle high-current pulse using a high power and high bandwidth amplifier and, at all other times, amplifying the detected pulse using a low power low bandwidth amplifier.

* * * * *

UNITED STATES PATENT AND TRADEMARK OFFICE
CERTIFICATE OF CORRECTION

PATENT NO. : 4,628,197
DATED : Dec. 9, 1986
INVENTOR(S) : William L. Thompson

It is certified that error appears in the above-identified patent and that said Letters Patent is hereby corrected as shown below:

Col. 3, line 4, change second occurrence of 500 to read --5,000--.

Col. 4, line 25, change (FIG. 1B) to read --(FIB. 18)--.

Col. 4, line 53, change "lowduty" to read --low-duty--.

Signed and Sealed this

Nineteenth Day of June, 1990

Attest:

HARRY F. MANBECK, JR.

Attesting Officer

Commissioner of Patents and Trademarks